Jan. 1, 1929.  1,697,044
J. BURDA
DEVICE FOR CUTTING GLASS
Filed April 8, 1927
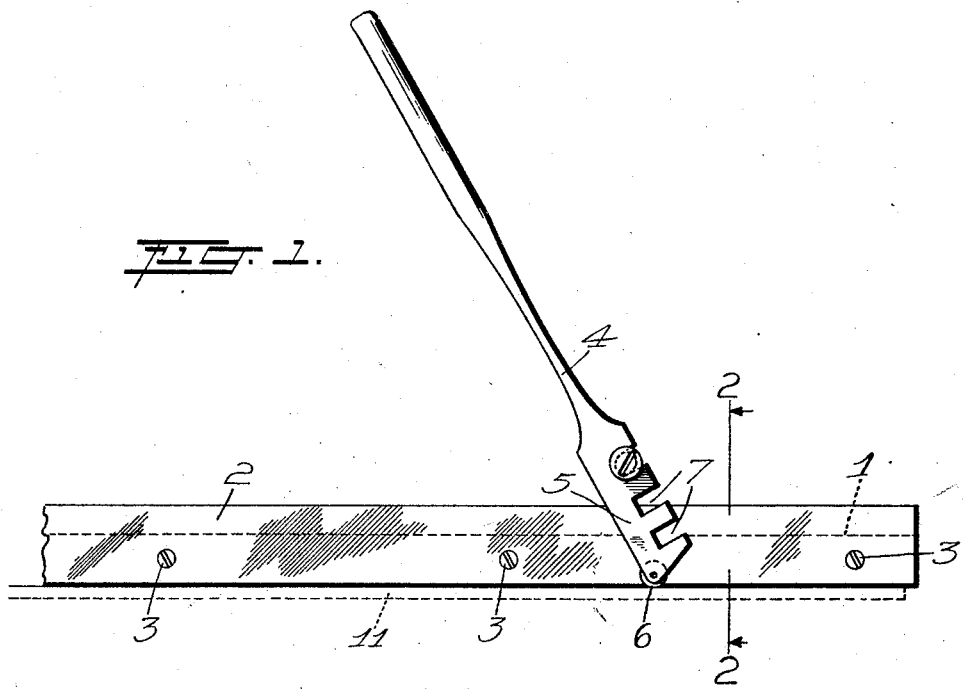
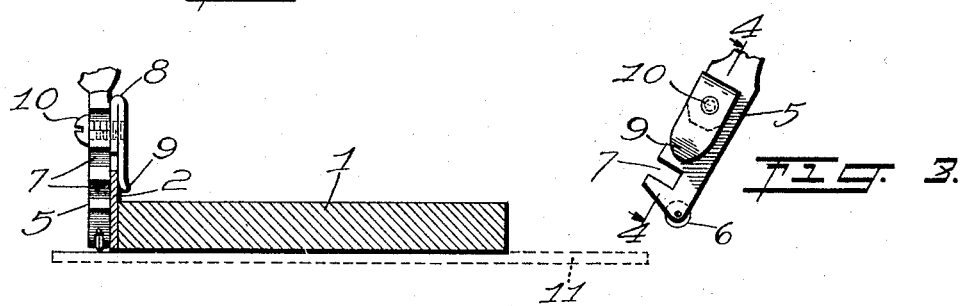
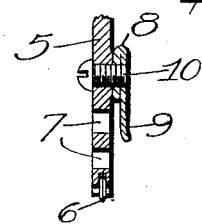
INVENTOR
J. BURDA
BY *Munn & Co.*
ATTORNEYS Patented Jan. 1, 1929.

1,697,044

UNITED STATES PATENT OFFICE.

JOSEPH BURDA, OF CHICAGO, ILLINOIS.

DEVICE FOR CUTTING GLASS.

Application filed April 8, 1927. Serial No. 182,103.

My invention relates to improvements in devices for cutting glass, and it consists in the combinations, constructions, and arrangements herein described and claimed.

In cutting glass with the ordinary straightedge, difficulty is sometimes experienced due to the fact that in moving a glass cutter along the straightedge it will be tilted to one side or the other, thus causing the scoring line to vary in its direction and depth. Such tilting may cause the glass to break unevenly, that is to say, not along a perfectly straight line.

An object of my invention is to provide a device by means of which one who is not particularly skilled in glass cutting may nevertheless cut the glass with a clean, straight edge.

A further object is to provide a device which makes use of the ordinary glass cutter to which a guide member has been attached that cooperates with the straightedge to prevent the glass cutter from tilting from side to side, the glass cutter being constrained by this guide member to follow a straight course.

A further object is to provide a device of the type described which is simple in construction and which can be manufactured at a relatively low cost.

Other objects and advantages will appear in the following specification, and the novel features of the invention will be particularly pointed out in the appended claims.

My invention is illustrated in the accompanying drawings, forming part of this application, in which Figure 1 is a side elevation of a device for cutting glass, Figure 2 is a section along the line 2—2 of Figure 1, Figure 3 is a view of a portion of a glass cutter, showing a guide member attached thereto, and Figure 4 is a section along the line 4—4 of Figure 3.

In carrying out my invention, I make use of a base 1, which may be of any suitable material, such as wood. This base is preferably rectangular and has secured to one side thereof a flange 2. This flange is preferably made of a flat strip of metal and may be secured to the base 1 by screws 3. As will be seen from the drawings, the flange extends substantially to the bottom of the base.

In Figure 1 I have shown an ordinary glass cutter which is used in connection with the flange 2, this glass cutter consisting of a handle 4 and a body portion 5 having a cutting-wheel 6. The body portion is provided with recesses 7, the normal purpose of these recesses being to receive a portion of the strip to be cut so as to break it off along the scored line. I utilize one of these recesses for the purpose of securing a guide member to the glass cutter. Thus in Figure 4 it will be observed that the body 5 of the glass cutter has secured to it a guide member, which in the present instance consists of a piece of metal 8 bent back upon itself and having a guide flange 9 spaced from the body portion. The guide member is held in position by means of a screw 10 which passes through one of the recesses 7 and into a threaded opening in the guide member 8. It will be observed that the lower edge of the guide flange 9 has a slightly outward turn.

From the foregoing description of the various parts of the device, the operation thereof may be readily understood. When it is desired to cut a piece of glass, such as that shown at 11 in dotted lines in Figures 1 and 2, the base portion is placed on the glass and the glass cutter is placed in position next to the guide flange 2, the guide member 8 straddling the guide flange 2 so as to cause the cutter to move along the straightedge formed by the flange 2 in a direction at all times parallel to the flange. Thus by placing the cutter in the position shown in Figure 1 and drawing it along the straightedge, the glass will be scored in a perfectly straight line and there will be no tilting nor wabbling of the glass cutter, since the guide member carried by it prevents such tilting.

With a construction such as described above, anyone can easily cut a piece of glass in a clean, straight line.

The guide member 8 is reversible; that is to say, it may be placed on either side of the body portion 5 of the glass cutter so that one may cut the glass by drawing the cutter in either direction, depending upon how the guide member is attached.

I claim:

1. A glass-cutting device, comprising a flat-bottomed base having a flange on one side thereof disposed at right angles to the bottom thereof and extending above the upper face of said base portion, a glass cutter provided with a body portion adapted to be moved in contact with said flange, and a guide member carried by the body portion and arranged to straddle the flange for guiding said glass cutter in its movement.

2. A glass-cutting device, comprising a base portion having a flat bottom and vertical sides, a flange consisting of a strip of metal secured to one side and extending above the upper face of said base portion, a glass cutter having a body portion adapted to be moved in contact with the face of said flange and being provided with a recess, a guide member having a guide flange arranged to engage the inner face of said first-named flange, and means disposed in the recess for removably securing said guide member to the body portion of said glass cutter.

3. A glass-cutting device, comprising a base portion having a flat bottom and vertical sides, a flat strip of metal secured to the face of one of said sides and being arranged to extend above the upper face of said base portion, a glass cutter having a body portion arranged to be moved in contact with the outer face of said strip of metal and having a recess, a guide member having a flange arranged to engage the inner face of said metal strip above the surface of the base, and a screw arranged to extend through said recess for detachably securing said guide member to the body portion of said cutter.

JOSEPH BURDA.